Nov. 26, 1963    E. C. SPENCER    3,111,971
STAKE POINTING MACHINE
Filed Dec. 28, 1961    2 Sheets-Sheet 1
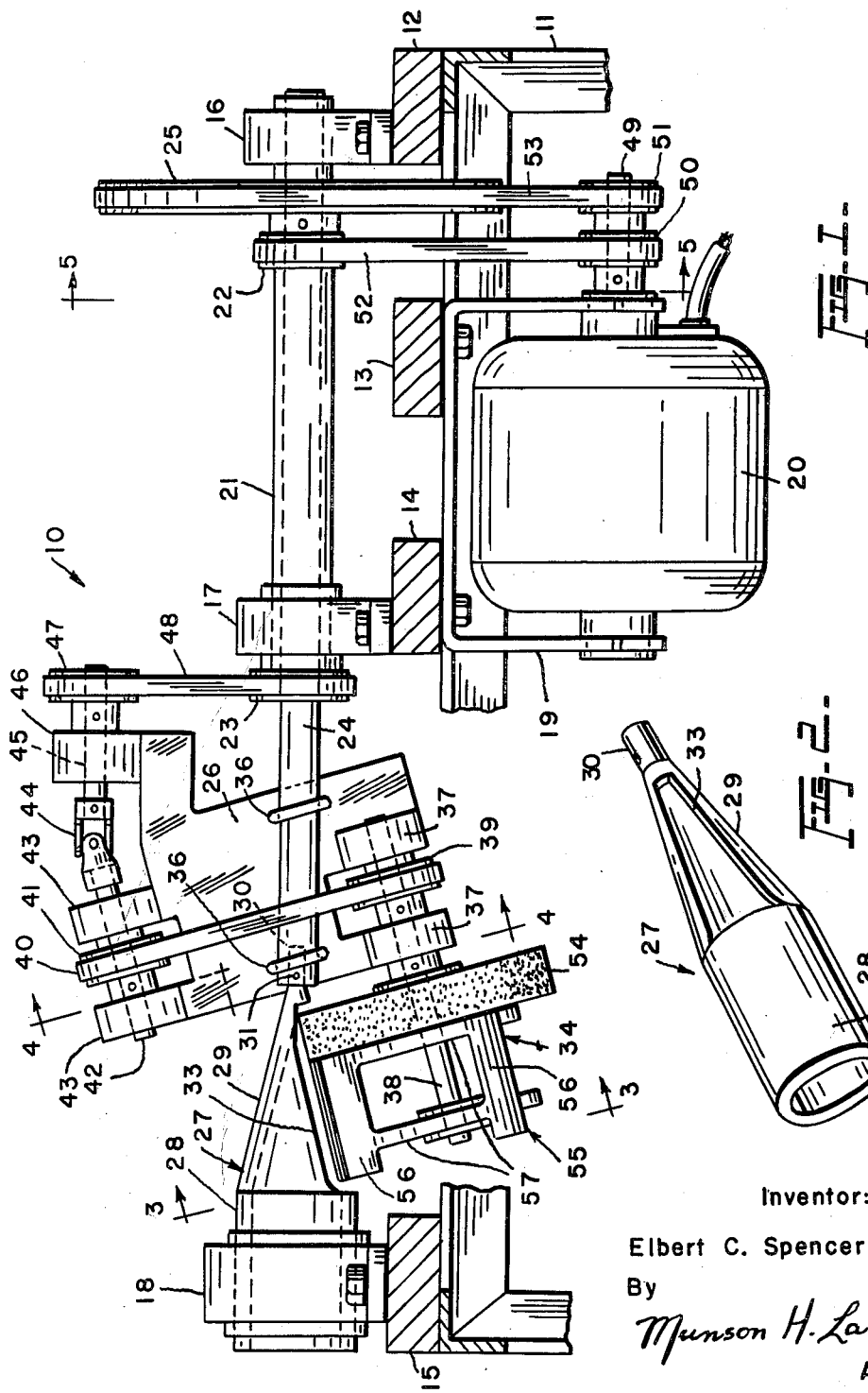
Inventor:
Elbert C. Spencer
By
Munson H. Lane
            Att'y.

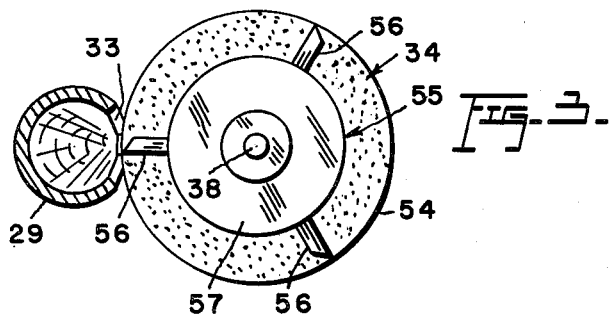
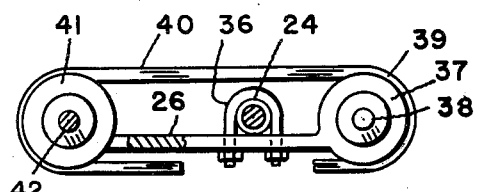
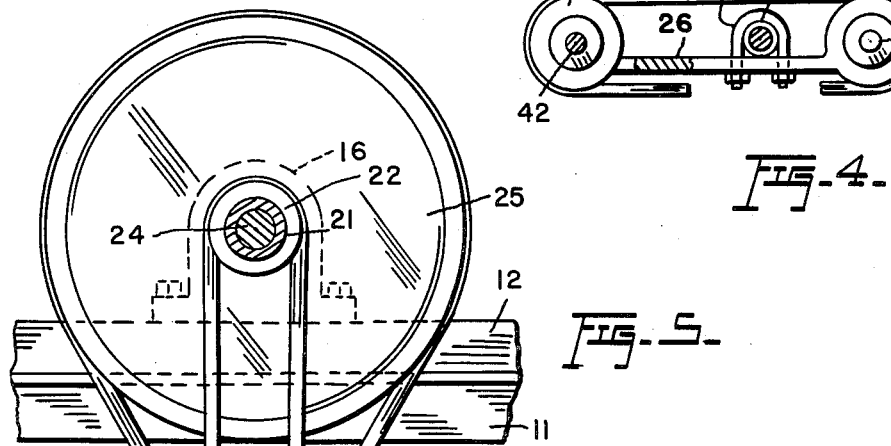
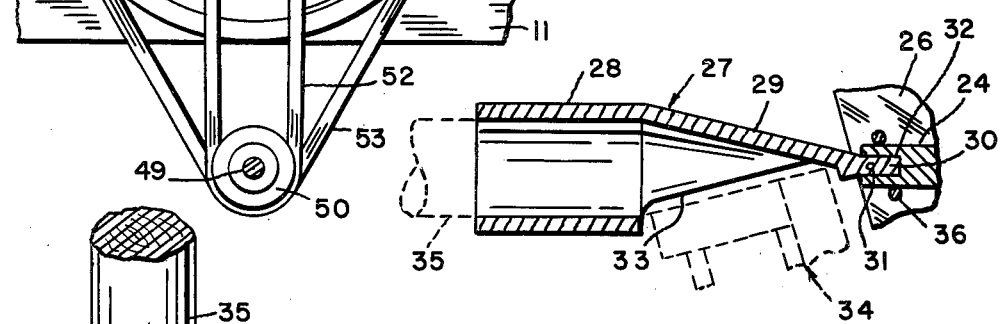
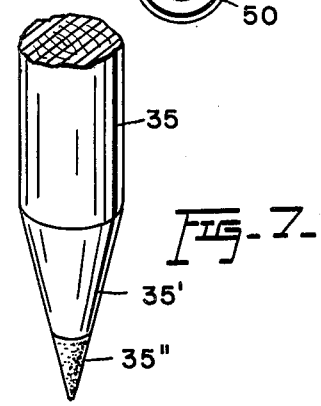
Inventor:
Elbert C. Spencer
By
Munson H. Lane
Att'y.

3,111,971
STAKE POINTING MACHINE
Elbert C. Spencer, Rte. 1, Stanton, Ky.
Filed Dec. 28, 1961, Ser. No. 162,786
7 Claims. (Cl. 144—30)

This invention relates to new and useful improvements in machines for pointing ends of sticks, stakes, posts, poles, or the like, such as tobacco sticks, tomato sticks, highway stakes, fence posts, et cetera, and the principal object of the invention is to enable the pointing operation to be carried out in a highly efficient and expeditious manner and with the expenditure of a minimum amount of effort.

As such, the machine in accordance with the invention embodies in its construction a rotatable spindle having a stake receiving socket at one end thereof, a carrier which is rotatable with the spindle and has mounted thereon rotatable stake pointing means which are operable on a stake in the socket to point the same when rotation is imparted to the pointing means and the spindle is also rotated so as to revolve the pointing means around the stake.

An important feature of the invention resides in a novel arrangement of the aforementioned components whereby rotation of the pointing means and revolving thereof around the stake are both derived from a common source of power, with simple but effective means being employed to operatively connect the power source to produce the revolving and rotating movements.

Another important feature of the invention resides in a structural arrangement of the post or stake receiving socket which includes a hollow, substantially conical portion adapted to receive stakes or various sizes and cross-sectional shapes, this socket portion being formed with a recess or open side through which the aforementioned pointing means may operatively engage a stake therein.

Another important feature of the invention involves the provision of pointing means which include cutter means and abrading means in juxtaposed, coaxial relation, the cutting means serving the primary function of pointing the stake and the abrading means operating to grind or polish the extremity of the stake point to prevent the same from chipping or cracking when the stake is subsequently driven into the ground.

Other advantages of the invention reside in its simplicity of construction, efficient and dependable operation, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary view, partly in vertical section and partly in elevation, showing the stake pointing machine in accordance with the invention;

FIGURE 2 is a perspective view of the stake receiving socket used in the invention;

FIGURE 3 is a sectional view, taken substantially in the plane of the line 3—3 in FIGURE 1;

FIGURE 4 is a fragmentary sectional view, taken substantially in the plane of the line 4—4 in FIGURE 1;

FIGURE 5 is a fragmentary sectional view, taken substantially in the plane of the line 5—5 in FIGURE 1;

FIGURE 6 is a fragmentary vertical sectional view of the stake socket and its connection to the spindle; and FIGURE 7 is a fragmentary perspective view showing a pointed stake.

Referring now to the accompanying drawings in detail, the stake pointing machine in accordance with the invention is designated generally by the reference numeral 10 and embodies in its construction a suitable supporting frame 11 having a plurality of cross members 12, 13, 14, 15 thereon, the members 12, 14 and 15 being used to support bearings 16, 17, 18, respectively, and the member 14 also being used in conjunction with the member 13 to support a mounting bracket 19 of an electric motor 20 whereby the machine is driven. The bearings 16, 17, 18 are coaxially disposed, the bearing 17 having rotatably journalled therein a tubular sleeve 21 which is provided at the ends thereof with belt pulleys 22 and 23. A spindle 24 is rotatably positioned in and projects at both ends from the sleeve 21, one end portion of the spindle being rotatably journalled in the bearing 16 and having secured thereto a relatively large pulley 25 which is disposed between the bearing 16 and the sleeve pulley 22, as shown.

The other end portion of the spindle 24 has secured thereto a carrier 26 hereinafter more fully described and this end of the spindle is rigidly connected to a stake receiving socket 27. The socket 27 includes a straight, tubular open-ended portion 28 which is rotatably journalled in the bearing 18, a substantially conical, hollow portion 29, a spigot 30 which is secured by a cross pin 31 in a blind bore 32 provided in the adjacent end of the spindle 24, as will be clearly apparent. The socket portion 29 is provided at one side thereof with a recess 33 through which pointing means 34, hereinafter described, may operate upon the end portion of a stake 35 inserted in the socket.

The aforementioned carrier 26 is in the form of a plate which is rigidly secured to the spindle 24 by suitable clamps 36 and projects to both sides of the spindle, as illustrated. One side or portion of the carrier plate is equipped with a pair of bearings 37 for a shaft 38 which carries the pointing means 34 and also a pulley 39, the latter being connected by an endless belt 40 to a similar pulley 41 on a shaft 42 which is rotatably journalled in a pair of bearings 43 at the relatively opposite side of the carrier plate 26. The shaft 42 is connected by a universal joint 44 to a shaft 45 journalled in a bearing 46 on the carrier plate, and the shaft 45 carries a pulley 47 which is connected by an endless belt 48 to the aforementioned sleeve pulley 23.

The armature 49 of the motor 20 is provided with a pair of pulleys 50, 51, the former being connected by a belt 52 to the sleeve pulley 22, while the latter is connected by a belt 53 to the relatively large pulley 25 on the spindle 24. It will be apparent from the foregoing that when the motor 20 is energized, the belt 52 will rotate the sleeve 21 which, through the medium of the belt 48, will rotate the shafts 45, 42 and 38, thus imparting rotation to the stake pointing means 34 at a relatively rapid speed. At the same time, the belt 53 will rotate the spindle 24 at a relatively low speed in view of the reduction pulleys 51, 25, and rotation of the spindle 24 together with the carrier 26 will cause the pointing means 34 to revolve around the stake 35 in the socket 27, while pointing of the stake is effected by rotation of the means 34. It will be understood, of course, that the socket 27 rotates with the spindle 24 and carrier 26, so that the relationship of the carrier to the socket remains unchanged during rotation of the spindle and thus the pointing means 34 are always in position to operate on the stake in the socket through the recess 33.

The pointing means 34 comprise an abrading wheel 54 and a cutter unit 55 secured in juxtaposed, coaxial relation to the shaft 38, the cutter unit 55 consisting of a plurality of circumferentially spaced cutter blades 56 supported by discs 57 on the shaft 38.

The cutter blades 56 are operable through the recess 33 in the major end region of the conical socket portion 29 while the abrading wheel 54 is operable in the minor end region thereof. The cutter blades 56 primarily serve to point or taper the end portion of the stake 35 as indicated at 35' in FIGURE 7, while the abrading wheel 54 imparts a grinding and a polishing action to the extremity of the stake point, as indicated at 35", whereby the polished extremity is safeguarded against chipping or cracking when the stake is subsequently driven into the ground.

It is to be particularly noted that the conical portion 29 of the socket 27 is adapted to receive stakes of various thicknesses and cross-sectional forms, such as round stakes, square stakes, triangular or hexagonal stakes, and the like. Of course, when a stake is inserted in the socket, it is held by hand against rotation while the pointing operation is in progress, and when it is completed, the pointed stake may be readily withdrawn from the socket.

While the pointing means 34 should rotate at relatively high speed, the revolving motion thereof around the stake should be quite slow and if the speed reduction afforded by the pulleys 51, 25 is not slow enough for this purpose, a speed reducing countershaft (not shown) may be employed. Also, while for sake of simplicity the belts 40, 48, 52 and 53 have been shown as single belts, double belts and pulleys may be utilized, if so desired.

Thus, while in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a stake pointing machine, the combination of a rotatable spindle, a stake receiving hollow tapered socket provided at one end of said spindle and rotatable therewith, said socket having a small inner end connected to said spindle and a larger open outer end facing away from said spindle; a carrier attached to and rotatable with said spindle, stake pointing mechanism rotatably mounted on said carrier adjacent said socket, means for rotating said spindle, and means for rotating said pointing means, including a sleeve rotatably mounted on said spindle and means operatively connecting said sleeve to said pointing means.

2. The device as defined in claim 1 wherein said tapered socket includes a hollow substantially conical portion provided at one side thereof with a recess whereby said pointing means may engage a stake in said conical portion of the socket.

3. The device as defined in claim 1 wherein said pointing means are rotatable about an axis oblique to and divergent from the axis of said spindle in the direction of said socket.

4. The device as defined in claim 1 wherein said pointing means include relatively wide cutter blade means and a relatively narrow abrading wheel disposed in juxtaposed coaxial relation.

5. In a stake pointing machine, the combination of a supporting frame, a spindle rotatably mounted on said frame, a stake receiving hollow tapered socket provided at one end of said spindle and rotatable therewith, said socket having a small inner end connected to said spindle and a large open outer end facing away from the spindle, a portion of the socket adjacent the spindle being substantially conical and provided at one side thereof with a recess, a carrier secured to said spindle for rotation therewith, stake pointing means rotatably mounted on said carrier and engageable with a stake in said socket through said recess thereof, said pointing means being rotatable about an axis oblique to and divergent from the axis of said spindle in the direction of said socket, a sleeve rotatably positioned on the spindle, means operatively connecting said sleeve to said pointing means, means for rotating said spindle, and means for rotating said sleeve at a greater speed than the spindle.

6. The device as defined in claim 5 wherein said pointing means include relatively wide cutter blade means and a relatively narrow abrading wheel disposed in juxtaposed coaxial relation.

7. The device as defined in claim 6 wherein said conical portion of said socket includes a major end region and a minor end region, said cutter blade means and said abrading wheel being operative respectively in the major and minor end regions of said socket portion.

References Cited in the file of this patent
UNITED STATES PATENTS

| | | |
|---|---|---|
| 653,286 | Cook | July 10, 1900 |
| 894,600 | Chadwick | July 28, 1908 |
| 1,029,958 | Thompson | June 18, 1912 |
| 2,243,490 | Walker | May 27, 1941 |
| 2,979,031 | Phlibotte | Apr. 11, 1961 |
| 3,073,362 | Bourdon | Jan. 15, 1963 |